UNITED STATES PATENT OFFICE.

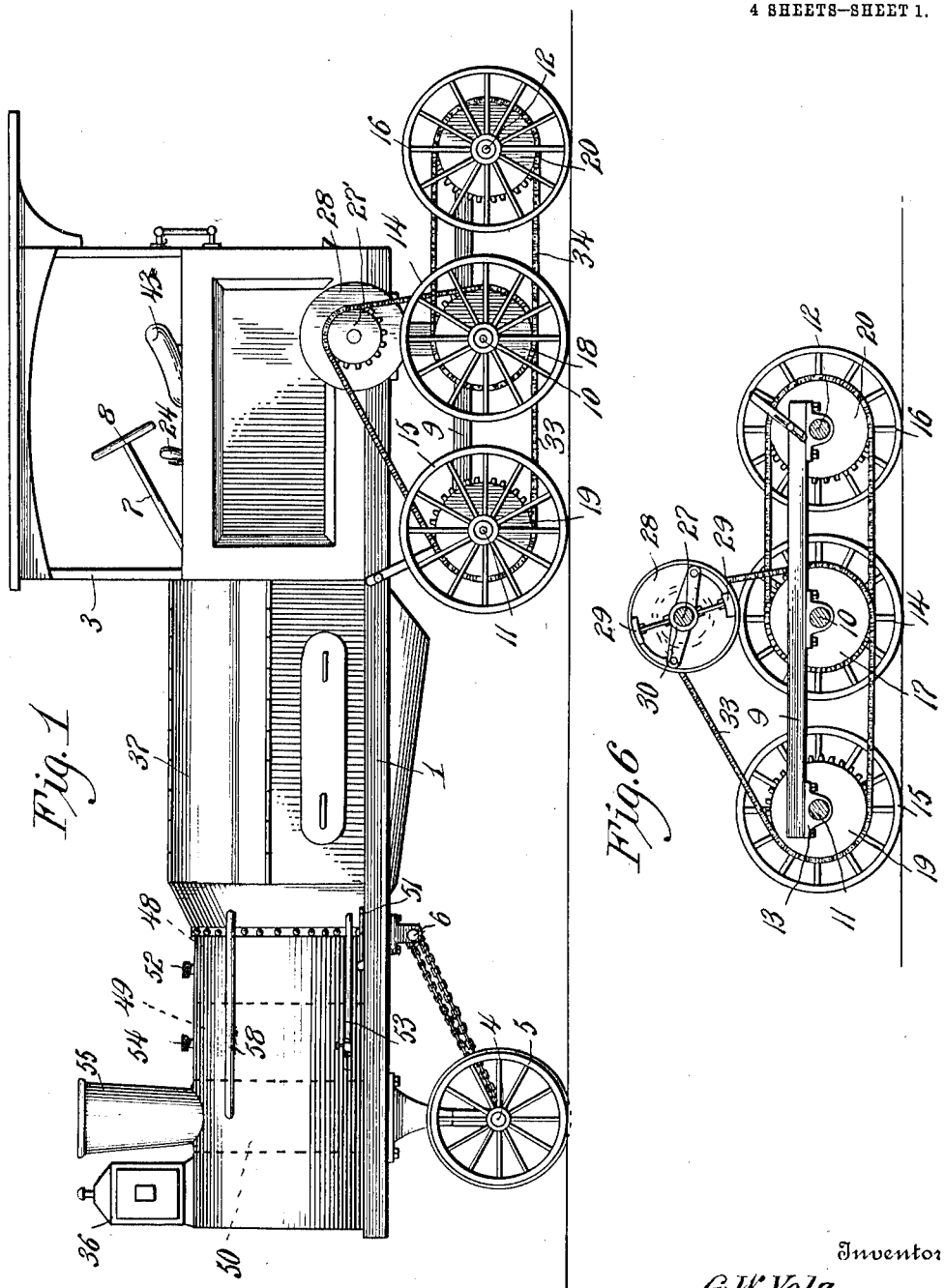

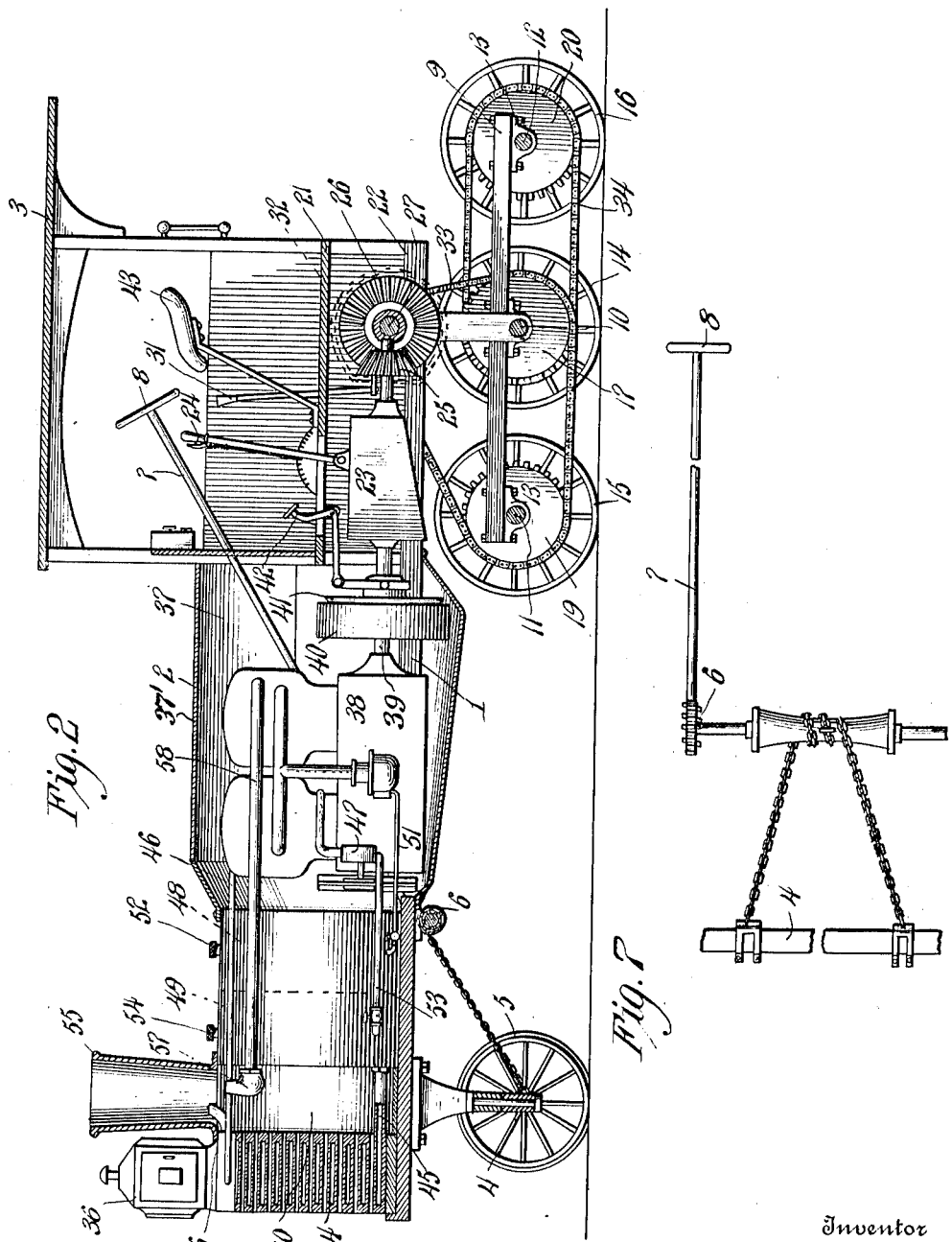

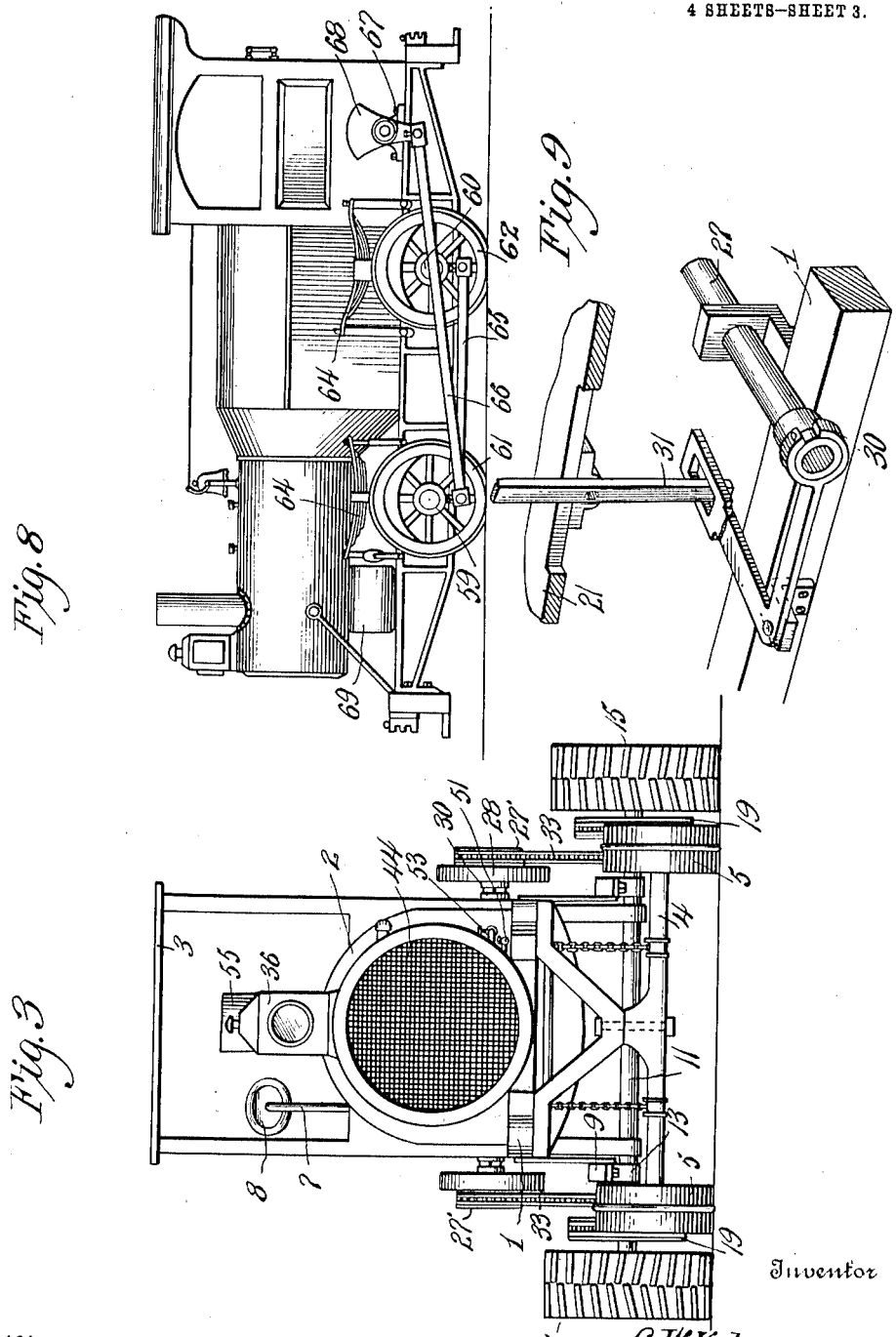

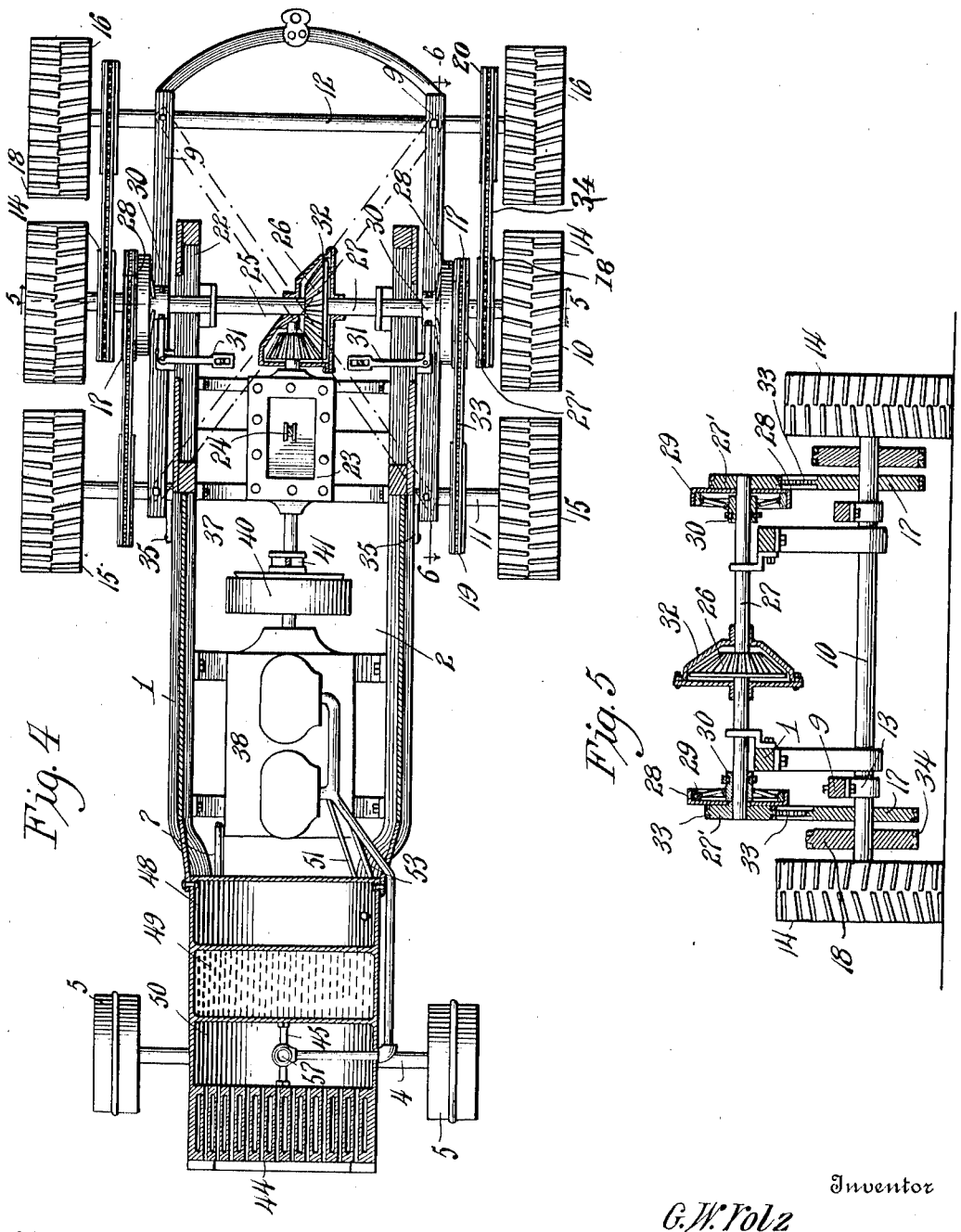

GOTTLIEB W. VOLZ, OF WASHTUCNA, WASHINGTON, ASSIGNOR OF ONE-HALF TO LINN L. BASSETT, OF WASHTUCNA, WASHINGTON.

LOCOMOTIVE OR TRACTION-ENGINE.

1,074,028.  Specification of Letters Patent.  Patented Sept. 23, 1913.

Application filed March 12, 1912. Serial No. 683,302.

*To all whom it may concern:*

Be it known that I, GOTTLIEB W. VOLZ, a citizen of the United States, residing at Washtucna, in the county of Adams and State of Washington, have invented new and useful Improvements in Locomotives or Traction-Engines, of which the following is a specification.

This invention relates to improvements in locomotives or traction engines which may be employed for either railway or road work, the object of the invention being to provide a simple, light, strong, durable, powerful and inexpensive type of tractor which employs as its source of driving energy an internal combustion motor, which is designed for the effective use of such a motor to the best advantage, and which is economical in operation and easily controlled.

A further object of the invention is to provide for the escape of the exhaust from the motor and of any steam which may be generated in the cooling circuit, in such manner as to increase the supply of air to the radiator.

A further object of the invention is to provide a tractor in which the motor gearing and controlling parts are protected from dust and dirt and the driver or operator protected from liability of injury from the gearing or other internal moving parts of the tractor.

The invention consists of the novel features of construction, combination and arrangement of parts hereinafter fully described and claimed, reference being had to the accompanying drawings, in which:

Figure 1 is a side elevation of a locomotive or traction engine embodying my invention. Fig. 2 is a vertical longitudinal section of the same. Fig. 3 is a front elevation. Fig. 4 is a horizontal section. Fig. 5 is a vertical transverse section on line 5—5 of Fig. 4. Fig. 6 is a detail section on line 6—6 of Fig. 4. Fig. 7 is a detail view of the steering gear. Fig. 8 is a side elevation showing a form of locomotive embodying the invention.

Referring to the drawings, 1 designates the main frame of the engine or locomotive; 2, the body thereof; and 3, a cab arranged at the rear end of the body. Pivotally mounted at the front of the body is an axle 4 carrying steering and supporting wheels 5, said axle being connected with steering gear 6 of the worm type operated by a rod 7 projecting into the cab and provided with a hand wheel 8. At its rear the engine is supported upon a truck frame 9 carrying central front and rear axles 10, 11, and 12 journaled in adjustable boxes 13. The truck 9 is pivotally supported upon the main frame so that the wheels carried thereby may accommodate themselves to irregularities of surface. On the ends of the axles 10, 11, and 12 are loosely mounted driving and supporting wheels 14, 15, and 16 which respectively carry sprocket wheels 17, 18, 19, and 20, the wheels 17 and 18 being mounted side by side upon the coacting wheel 14, all of said sprocket wheels being fixed to the driving and supporting wheels and suitable antifriction bearings being interposed between the wheels and the stationary axles.

The floor 21 of the cab is elevated to provide a base compartment 22 in which is arranged a suitable selective transmission gearing 23 controlled by a lever 24, the rear end of the shaft of which gearing carries a beveled gear 25. This gear meshes with a beveled gear 26 on a transverse drive shaft 27 extending across and through the sides of the compartment 22 and provided at each end with a sprocket drive wheel 27 loosely mounted thereon. The hub of each sprocket drive wheel 27 has fixed thereto a friction drum 28 engaged by the shoes 29 of a friction clutch device 30 of any suitable type, the respective clutches being independently controlled by levers 31, whereby the sprocket drive gears may be independently thrown into and out of action. A hood 32 is provided to inclose the gears 25 and 26 and protect the same from dust and dirt. A drive chain 33 engages each sprocket drive gear 27 and passes around the sprocket wheels 17 and 19 on the adjacent ends of the shafts 10 and 11, while a sprocket chain 34 passes around the sprocket wheels 18 and 20 on the adjacent ends of the shafts 10 and 12, the drive gearing thus being duplicated at each side of the engine and all of the wheels coupled for a driving action. The chains may be tightened or loosened whenever desired by adjusting the boxes 13, as will be readily understood.

All of the supporting wheels may be of the road type or rail type, to adapt the engine for either road or railway use, and by a slight rearrangement of the parts spur or bevel gearing may be provided between the wheels instead of the sprocket drive gearing. Links or other suitable connections 35 may be provided between the truck and main frame to limit the play of the truck. In steering the engine, the front wheels 5 are turned in the desired direction by the operation of the rod or shaft 7, and the sprocket drive gear on the side of the engine describing the greater arc thrown out of action so that it may turn loosely on the driving shaft, allowing the supporting wheels at such side to turn at the required greater rate of speed.

The body 2 simulates in general the form of a locomotive boiler and may be provided with a headlight 36 of any suitable type. Said body 2 is hollow and is provided at its rear with a compartment 37 in which is arranged an internal combustion motor 38, the shaft 39 of which carries a combined fly and friction clutch wheel 40 adapted to be engaged by a friction clutch member 41 on the adjacent end of the shaft of the transmission gearing, said clutch member 41 being controlled by a treadle or foot lever 42 arranged within the cab, whereby the transmission gearing may be thrown into and out of connection with the motor whenever desired. The controlling devices within the cab are all arranged so as to be readily operated by the driver occupying a seat 43.

At the forward end of the body 2 is a radiator 44 of the honeycomb type which communicates with the water jacket of the motor through suitable pipes or passages 45 and 46, whereby the cooling water may be circulated through the radiator in a well known way. The return or delivery pipe 45 has arranged therein a centrifugal or other suitable type of pump 47 driven by the motor and by means of which the cooling water is drawn from the bottom of the radiator, forced into and through the water jacket of the motor and then delivered to the radiator for a continuous circulation.

Between the motor chamber and the radiator the body 2 is provided with compartments 48, 49, and 50. The compartment 48 forms a storage tank for the hydrocarbon or other fuel which is delivered to the motor or carbureter by a valve feed pipe 51, said tank being provided with a suitably closed filling inlet 52. The compartment 49 serves as a water tank which communicates with a valved pipe 53 with the radiator, whereby the cooling circuit may be replenished with water whenever desired. This tank is provided with a suitably closed filling inlet 54. The compartment 50 communicates with the cells of the radiator and with a draft stack or tube 55 carried by the body. Said compartment 50 forms in effect a partial vacuum chamber to facilitate and promote the flow of air through the radiator and the exhaust of the spent products of combustion from the motor. As shown, the vent pipe 56 of the radiator projects into the stack, through which pipe any steam which may be generated in the cooling circuit is permitted to escape. Also arranged to discharge within the stack is a nozzle 57 connected with the delivery end of a pipe 58 through which the exhaust from the motor is discharged. The vapor and products of combustion so discharging into the stack create a partial vacuum in the stack and chamber 50, whereby the exhaust of the products of combustion from the motor is promoted and the flow of air through the cells of the radiator increased, the cooling action being to a large extent regulated automatically by the exhaust, by which the temperature of the cooling liquid will be regulated according to the working energy of the motor, as will be readily understood. The motor chamber 37 is provided with a double hinged door or hood 37', whereby access to the motor may be obtained at any time.

From the foregoing description, it will be observed that all of the elements of the gearing are inclosed in such a manner as to be protected from injury and to avoid possibility of injury to the engineer or driver, and that a simple type of engine is provided which strongly simulates in appearance the general form and configuration of an ordinary locomotive.

It will be understood of course that an internal combustion motor of any desired power may be employed, and that the engine may be adapted for either road or railway work for light hauling and traction purposes of all kinds. It will further be observed that by the construction described a simple, light, strong, durable and inexpensive type of engine is produced which may be operated with economy, and that as all of the controlling elements are located within the cab, the engine will be at all times under the ready and complete control of the driver.

In the embodiment of my invention shown in Fig. 8, a main frame and body of somewhat different form are provided, but are of the general type hereinbefore described, a style of engine more particularly adapted for railway work being, however, disclosed. This engine is mounted upon front and rear transverse axles 59 and 60 on which are journaled sets of driving wheels 61 and 62, said axles and wheels having spring supports 64. The spring supports of the front axle may be, in practice, connected by the usual equalizing coupling. The wheels at each side are coupled by connecting rods 65 and to the front wheel at each side is connected a drive rod 66 coupled to a driving crank 67 mounted on the drive shaft 27 and provided with a counter-balancing weight 68. The cranks 67 at the opposite sides of the engine are set on quarter in the usual manner, so that when one crank is on dead center the other will be exerting a driving effect. With minor exceptions the features of construction in this embodiment of the invention are the same as that disclosed in Figs. 1 to 7, inclusive, and need not be specifically recited. I have, however, shown in Fig. 8 an air reservoir or tank 69 which may form part of an air brake system having a pressure pump operated by the motor. In both constructions, however, it is intended to employ brake devices which will operate upon the driving shaft instead of the wheels, thus allowing as many parts as possible to be housed and protected, but as this brake mechanism forms no part of the present invention it is not specifically disclosed.

Having thus described the invention, what I claim is:

1. A locomotive or traction engine including a cab and a hollow body, said body being provided with a motor chamber, fuel and water compartments arranged in advance thereof, a cellular radiator spaced from said compartments to provide a vacuum inducing chamber, and a draft inducing stack communicating with said chamber, a motor inclosed within the motor chamber, connections between the water compartment, radiator and water jacket of the motor, an exhaust pipe leading from the motor to said vacuum inducing chamber, a steam vent pipe leading from the water jacket of the motor to the stack, running gear including a drive shaft disposed within the cab, transmission mechanism between said drive shaft and the motor shaft, means for controlling the same, and a clutch device for throwing the transmission mechanism into and out of connection with the motor shaft.

2. A locomotive or traction engine including a cab, and a hollow body, running gear including fixed axles, wheels mounted to revolve upon the axles, gearing between said wheels, said gearing being operative for independently stopping the opposite series of wheels, a drive shaft disposed within the cab, a motor upon the body for driving said shaft, gearing between the drive shaft and each set of driving wheels, and clutches for throwing the gearing for driving the respective sets or series of wheels independently of each other.

In testimony whereof I affix my signature in presence of two witnesses.

GOTTLIEB W. VOLZ.

Witnesses:
   J. A. McKissick,
   J. O. Tracy.